(12) United States Patent
Shimizu et al.

(10) Patent No.: US 7,961,993 B2
(45) Date of Patent: Jun. 14, 2011

(54) OPTICAL SWITCH AND CONTROL METHOD OF OPTICAL SWITCH, AND CONTROL METHOD OF MEMS DEVICE

(75) Inventors: Takashi Shimizu, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 12/292,278

(22) Filed: Nov. 14, 2008

(65) Prior Publication Data

US 2009/0245727 A1    Oct. 1, 2009

(30) Foreign Application Priority Data

Mar. 28, 2008   (JP) ................. 2008-087460

(51) Int. Cl.
*G02B 6/26* (2006.01)
*G02B 26/08* (2006.01)
(52) U.S. Cl. ............ 385/18; 359/199.2; 359/200.6; 359/224.1; 359/900
(58) Field of Classification Search .......... 359/199.2, 359/200.6, 214.1, 221.1, 221.2, 224.1, 298, 359/847, 877, 900; 385/16, 18, 20, 31, 47
See application file for complete search history.

(56) References Cited

U.S. PATENT DOCUMENTS

| 7,697,179 | B2 * | 4/2010 | Nanjyo et al. ............ 359/198.1 |
| 2002/0109076 | A1 | 8/2002 | Tochio et al. |
| 2007/0216423 | A1 | 9/2007 | Grosjean et al. |
| 2008/0100899 | A1 * | 5/2008 | Shimokawa et al. ......... 359/225 |

FOREIGN PATENT DOCUMENTS

| EP | 2 060 871 A2 | 5/2009 |
| JP | 2002-236264 | 8/2002 |
| WO | 00/13210 | 3/2000 |

OTHER PUBLICATIONS

Zhang X M et al., "A Study of the Static Characteristics of a Torsional Micromirror", Sensors and Actuators A, Elsevier Sequoia S.A., Lausanne, CH, vol. A90, No. 1/02, May 1, 2001, pp. 73-81.
Cheol-Hyun Han et al, "Parylene-diaphram Piezoelectric Acoustic Transducers", 20000123-20000127, Jan. 23, 2000, pp. 148-152.
William D. Greason, "Analysis of Charge Injected Processes including ESD in MEMS" 29th Electrical Overstress/Electrostatic Discharge Symposium, Sep. 1, 2007, pp. 2B. 4-1-4-6.
European Search Report mailed Jul. 10, 2009 and issued in corresponding European Patent Application 08020328.4.

* cited by examiner

*Primary Examiner* — Frank G Font
(74) *Attorney, Agent, or Firm* — Staas & Halsey LLP

(57) ABSTRACT

A control section of an optical switch calculates information relating to a polarization amount in an insulating film at each predetermined time, to update the information relating to the polarization amount in the insulating film. On the other hand, when a drive voltage is applied to a MEMS mirror, an initial value of the drive voltage corresponding to an input setting command is read out from an initial value memory, and also, the information relating to the polarization amount in the insulating film is read out from the polarization amount memory, and the initial value of the drive voltage is corrected according to the read information relating to the polarization amount in the insulating film, to thereby set a new drive voltage, and the new drive voltage is applied on electrodes of the MEMS mirror.

15 Claims, 7 Drawing Sheets

| parameter | | unit | Parylen C |
|---|---|---|---|
| DENSITY | | g/cm³ | 1.289 |
| MELTING POINT | | °C | 280 |
| REFRACTIVE INDEX | | $n_0$ | 1.639 |
| GLASS TRANSITION | | °C | 87~97 |
| ELONGATION | BREAKING VALUE | % | 200 |
| | YIELD VALUE | % | 2.9 |
| BREAKDOWN VOLTAGE | pulse | V/25μm | 5600 |
| | step | V/25μm | 4700 |
| RESISTANCE VALUE | | Ωm | $8.8 \times 10^{14}$ |
| DIELECTRIC CONSTANT | 60Hz | | 3.15 |
| | 10kH | | 3.10 |
| | 10MHz | | 2.95 |
| DIELECTRIC DISSIPATION FACTOR | 60Hz | | 0.020 |
| | 10kH | | 0.019 |
| | 10MHz | | 0.013 |

OPTICAL SWITCH AND CONTROL METHOD OF OPTICAL SWITCH, AND CONTROL METHOD OF MEMS DEVICE

CROSS-REFERENCE TO RELATED APPLICATION

This application is based upon and claims the benefit of priority of the prior Japanese Patent Application No. 2008-87460, field on Mar. 28, 2008, the entire contents of which are incorporated herein by reference.

FIELD

The embodiments discussed herein are relates to a control method of a MEMS device manufactured using a MEMS (Micro Electro Mechanical Systems) technology, an optical switch using a reflecting mirror as the MEMS device (to be referred to as "MEMS mirror", hereunder) and a control method of the optical switch.

BACKGROUND

In recent years, the development of MEMS devices has been actively made, and such MEMS devices are utilized for optical components such as an optical switch.

As a conventional technology relating to the optical switch using a MEMS mirror as the MEMS device, there has been the following technology. Namely, in a configuration in which an angle of the MEMS mirror is controlled by an electrostatic force generated by applying a drive voltage to thereby lead an input optical signal to a predetermined output position, angle deviation of the MEMS mirror is corrected, based on position information for a branched light of the optical signal reflected by the MEMS mirror or the power of the optical signal (refer to Japanese Unexamined Patent Publication No. 2002-236264).

Among the MEMS devices, there is the one, for example, in which a surface of an electrode is coated by an insulating film, in order to suppress electric discharge (generation of secondary electrons) due to the application of the drive voltage. In the optical switch using the MEMS mirror of such a configuration, since polarization occurs in the insulating film due to the application of the drive voltage, there may be deviation in displacement (angle) of the MEMS mirror relative to the drive voltage. Further, a polarization amount in the insulating film is also changed depending on hysteresis of the drive voltage.

In the above conventional technology, since the angle deviation of the MEMS mirror is regulated based on the power of the branched light of the optical signal reflected by the MEMS mirror or the power of the output optical signal, it is possible to cope with, to some extent, the deviation in displacement (angle) of the MEMS mirror relative to the drive voltage, which occurs due to the polarization in the insulating film.

However, according to the above conventional technology, since the power of the branched light of the optical signal or the power of the output optical signal is detected, an insertion loss by the optical switch is further increased. The insertion loss is one of important characteristics of the optical switch, and in the optical switch, it is desirable to suppress the insertion loss as much as possible.

Further, it is necessary to dispose an apparatus (a sensor or the like) for detecting position information relating to the branched light or the power of the optical signal, and therefore, a problem in cost performance still remains.

Incidentally, the deviation in a displacement amount of the movable body relative to the drive voltage is not a problem limited to the MEMS mirror, but is a problem common to MEMS devices each for driving the movable body by the electrostatic force, of which electrode is coated by the insulating film.

SUMMARY

According to an aspect of the present invention, there is provided an optical switch. The optical switch includes at least one MEMS mirror and a control section that regulates an angle of an optical reflecting surface of the MEMS mirror to lead an input optical signal to a predetermined output position. In the MEMS mirror, at least one of a movable electrode disposed on a movable body including the optical reflecting surface and a fixed electrode arranged to face the movable electrode is coated by an insulating film, and the angle of the optical reflecting surface is changed by an electrostatic force generated when a drive voltage is applied between the movable electrode and the fixed electrode. Further, the control section comprises: a polarization amount memory which stores information relating to a polarization amount in the insulating film; a polarization amount calculating section that calculates the information relating to the polarization amount in the insulating film at each predetermined time to update the information relating to the polarization amount in the insulating film stored in the polarization amount memory; a drive voltage setting section that reads out the information relating to the polarization amount in the insulating film from the polarization amount memory, and corrects the drive voltage according to the read information relating to the polarization amount in the insulating film, to set a new drive voltage; and a driving section that applies the set new drive voltage between the movable electrode and the fixed electrode.

According to another aspect of the present invention, there is provided a control method of an optical switch which includes at least one MEMS mirror and regulates an angle of an optical reflecting surface of the MEMS mirror to lead an input optical signal to a predetermined output position. In the MEMS mirror, at least one of a movable electrode disposed on a movable body including the optical reflecting surface and a fixed electrode arranged to face the movable electrode is coated by an insulating film, and the angle of the optical reflecting surface is changed by an electrostatic force generated when a drive voltage is applied between the movable electrode and the fixed electrode. Further, the control method of the optical switch: calculates information relating to a polarization amount in the insulating film at each predetermined time to update the information relating to the polarization amount in the insulating film stored in a polarization amount memory which stores the information relating to the polarization amount in the insulating film; reads out the information relating to the polarization amount in the insulating film from the polarization amount memory, and corrects the drive voltage according to the read information relating to the polarization amount in the insulating film, to set a new drive voltage; and applies the set new drive voltage between the movable electrode and the fixed electrode.

According to yet another aspect of the invention, there is provided a control method of a MEMS device in which at least one of a movable electrode disposed on a movable body and a fixed electrode arranged to face the movable electrode is coated by an insulating film, and the movable body is operated by an electrostatic force generated when a predetermined drive voltage is applied between the movable electrode and the fixed electrode. The control method of the MEMS device: calculates information relating to a polarization amount in the insulating film at each predetermined time to update the information relating to the polarization amount in the insulating film stored in a polarization amount memory which stores the information relating to the polarization amount in the insulating film; reads out the information relating to the polarization amount in the insulating film from the polarization amount memory, and corrects the drive voltage according to the read information relating to the polarization amount in the insulating film, to set a new drive voltage; and applies the set new drive voltage between the movable electrode and the fixed electrode.

Additional objects and advantages of the invention will be set forth in a part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF EMBODIMENTS

Hereinafter, an embodiment of the present invention will be described with reference to drawings.

Figure 1:
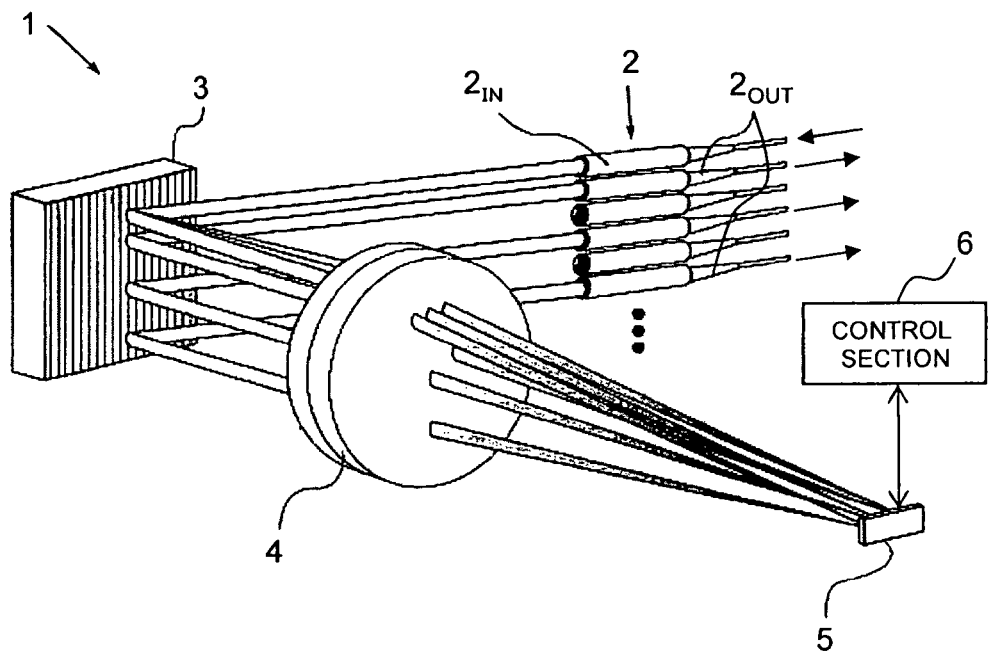
FIG. 1 is a diagram showing a wavelength selective switch as an optical switch according to one embodiment of the present invention.

FIG. 1 shows a wavelength selective switch (WSS) as an optical switch according to one embodiment of the present invention. As shown in FIG. 1, a wavelength selective switch 1 comprises: a fiber collimator array 2; a diffraction grating 3; a lens 4; a mirror array 5; and a control section 6 that controls an angle of each mirror of the mirror array 5.

The fiber collimator array 2 is configured such that (N+1) fiber collimators are arranged in one direction, and includes one input port $2_{IN}$ and a plurality of output ports $2_{OUT}$(#1) to $2_{OUT}$(#N). The diffraction grating 3 separates a wavelength division multiplexed light input from the input port $2_{IN}$ to different angle directions according to wavelengths. Optical signals ch1 to chN (to be referred to as "wavelength channels ch1 to chN, hereunder) of respective wavelengths separated by the diffraction grating 3 are respectively condensed on different positions by the lens 4. The mirror array 5 includes a plurality of mirrors (#1 to #N) disposed on condensing positions of the wavelength channels ch1 to chN. Each of the mirrors is a MEMS mirror using a MEMS technology.

The respective wavelength channels reached the mirror array 5 are reflected by the corresponding MEMS mirrors to be folded back to predetermined directions. The control section 6 controls the MEMS mirrors at angles corresponding to positions of the output ports set as output determinations of the wavelength channels. Thus, the wavelength channels folded back by the MEMS mirrors pass through the lens 4 and the diffraction grating 3 in this order, to be led to desired output ports.

Figure 2:
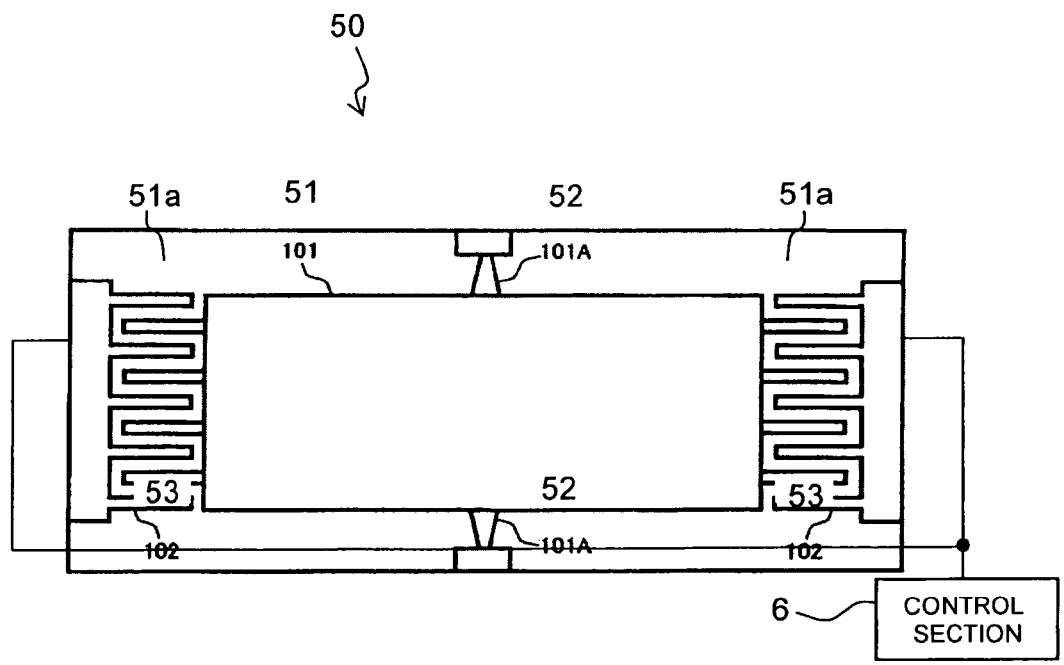
FIG. 2 is a diagram showing an overview configuration of a MEMS mirror used for the above wavelength selective switch.

FIG. 2 shows an overview configuration of the MEMS mirror. As shown in FIG. 2, a MEMS mirror 50 in the present embodiment comprises: a movable body 51 formed in an approximately rectangular shape; a pair of torsion bars 52, 52 supporting the movable body 51; and a pair of drive electrodes 53, 53 arranged to face each other, on both side faces parallel to the torsion bars 52, 52 of the movable body 51.

The movable body 51 is configured such that a surface thereof is a mirror reflecting light (optical reflecting surface), and is supported by the torsion bars 52, 52 to be swung around the torsion bars 52, 52. On both side faces (right and left side faces in the figure) parallel to the torsion bars 52, 52 of the movable body 51, a pair of electrode portions (movable electrodes) 51a, 51a each formed in a comb shape is disposed, and corresponding thereto, the pair of drive electrodes (fixed electrodes) 53, 53 is formed in a comb shape. Herein, the electrodes 51a, 51a are grounded, and a drive voltage (signal) for operating the movable body 51 is supplied to each of the drive electrodes 53, 53, so that the drive voltage is applied between the movable electrode and the fixed electrode.

The drive electrodes 53, 53 each is coated by an insulating film. In the present embodiment, an insulating film composed of macromolecules (parylene C) is used. Incidentally, the electrodes 51a, 51a on the side of the movable body 51 each may be coated by the insulating film in place of the drive electrodes 53, 53, or the drive electrodes 53, 53 and the electrodes 51a, 51a on the side of the movable body 51 each may be coated by the insulating film.

In the configuration as described above, when the drive voltage is applied between the drive electrode (fixed electrode) 53, 53 and the electrode 51a, 51a on the side of the movable body 51 by the control section 6, an electrostatic force according to the applied drive voltage is generated between the fixed and movable electrodes, and the movable body 51 is swung by the electrostatic force so that the mirror (the optical reflecting surface) is kept at a predetermined angle.

Next, there will be described a control of the MEMS mirror by the control section 6.

As described above, in the MEMS mirror 50 in the present embodiment, the drive electrodes 53, 53 each is coated by the insulating film, and with the application of the drive voltage, polarization occurs in the insulating film. Since a voltage (polarization voltage) is generated due to the polarization, an angle of the movable body 51 (that is, the optical reflecting surface) is deviated relative to the drive voltage. When the angle of the optical reflecting surface is deviated, attenuation of the optical signal is increased, and also, desired attenuation cannot be given to the optical signal.

Therefore, the control section 6 sets the drive voltage to be supplied to the MEMS mirror 50, taking the polarization in the insulating film into consideration. Namely, the control section 6 calculates information relating to a polarization amount in the insulating film, and corrects the drive voltage based on the calculated information relating to the polarization amount in the insulating film to set a new drive voltage, and applies the new drive voltage between the electrodes.

To be specific, the control section 6 calculates the information relating to the polarization amount in the insulating film at each predetermined time, and updates the information relating to the polarization amount in the insulating film stored in a polarization amount memory which stores the information relating to the polarization amount in the insulating film. On the other hand, in the control of the MEMS mirror 50, the control section 6 reads out the information relating to the polarization amount in the insulating film from the polarization amount memory at each predetermined time, and also, reads out the positions of the set output ports and/or an initial value (e.g., table value) of the drive voltage corresponding to the attenuation. Then, the control section 6 corrects the read initial value of the drive voltage according to the read information relating to the polarization amount, to calculate the new drive voltage, and applies the new drive voltage between the drive electrode (fixed electrodes) 53, 53 and the electrode (movable electrodes) 51*a*, 51*a* on the side of the movable body 51.

Herein, the information relating to the polarization amount in the insulating film includes a value correlating to the polarization amount in the insulating film (for example, a (effective) dielectric constant of the insulating film, which is changed due to the polarization or the polarization voltage generated by the polarization) as well as the polarization amount in the insulating film. Further, it is preferable to perform the calculation and update processing of the information relating to the polarization amount in the insulating film in synchronism with the calculation processing of the new drive voltage. This is because the new drive voltage can be set using the newest information relating to the polarization amount in the insulating film.

Especially, in the present embodiment, the information relating to the polarization amount in the insulating film after the lapse of the predetermined time is calculated (predicted) at each predetermined time, and the drive voltage is corrected based on the predicted information relating to the polarization amount in the insulating film to thereby set the new drive voltage, namely, the drive voltage is feedforward controlled. The detailed description of the control by the control section 6 will be made hereunder, and in this description, the polarization amount in the insulating film calculated based on a polarization amount calculating model (to be described later) is the information relating to the polarization amount in the insulating film.

Figures 3, 4:
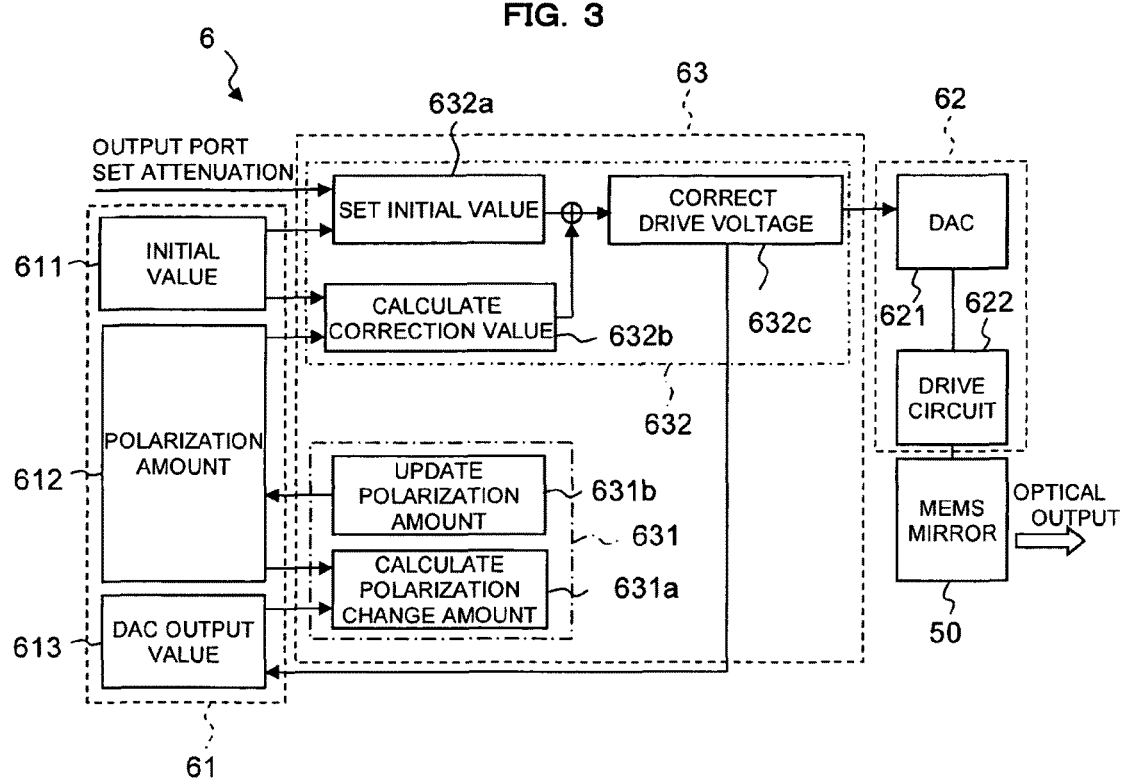
FIG. 3 is a block diagram showing a configuration of a control section for the above wavelength selective switch.
FIG. 4 is a diagram showing properties of one example (parylene C) of insulating film coating an electrode of the MEMS mirror.

FIG. 3 is a block diagram showing a configuration of the control section 6. As shown in FIG. 3, the control section 6 comprises: a memory section 61 that stores various information necessary for the control of the MEMS mirror 50; a driving section 62 that drives the MEMS mirror 50; and a control signal generating section 63 that generates a control signal for controlling a driving state (the angle of the optical reflecting surface) of the MEMS mirror 50 by the driving section 62.

The memory section 61 includes an initial value memory 611, a polarization amount memory 612 and a DAC output value memory 613. In the initial value memory 611, information relating to the angle of each MEMS mirror 50 and information relating to the drive voltage are previously stored. Herein, a table in which the wavelength channel numbers (ch1 to chN), the output port numbers (#1 to #N), the attenuation A and the drive voltage (initial value) are made to correspond to each other is stored. When the angle of the MEMS mirror is changed, coupling efficiency is changed and the attenuation is also changed. Therefore, in the present embodiment, a relation between the angle of each of the MEMS mirrors (#1 to #N) and the actual attenuation at this angle is previously obtained by the experiment or the calculation, and data of the relation is stored in the above table. By using such a table, an intensity level can be regulated for each wavelength channel, and a variable attenuating function can be realized. Accordingly, when a setting command for the output port of each wavelength channel and the attenuation is input, the table is referred to, so that the initial value of the drive voltage corresponding to the input setting command is read out.

However, a table to be stored in the initial value memory 611 is not limited to the above, and in place of the above table, a table in which the wavelength channel numbers, the output port numbers and the drive voltage (initial value) are made to correspond to each other may be stored. In this case, when a setting command for the output port of each wavelength channel is input, the initial value of the drive voltage corresponding to the set output port is read out. Further, in the case where the output port of each wavelength channel is previously set, a table in which the wavelength channel numbers, the attenuation and the drive voltage (initial value) are made to correspond to each other may be stored. In this case, since the output port of each wavelength channel is previously set, when a setting command for the attenuation is input, the initial value of the drive voltage corresponding to the set attenuation is read out.

The polarization amount memory 612 stores the polarization amount in the insulating film (a polarization amount in each group to be described later) calculated by a polarization amount calculating section 631 (to be described later). In other words, when the information relating to the polarization amount in the insulating film is newly calculated by the polarization amount calculating section 631, the polarization amount stored in the polarization amount memory 612 is updated based on the newly calculated polarization amount. Incidentally, in an initial state such as shipment time, "0" is stored in the polarization amount memory 612 as an initial value of the polarization amount in the insulating film.

The DAC output value memory 613 stores the control signal (a DAC output value, that is, the drive voltage) output to a DA converter 621 (to be described later) from the control signal output section 63. Accordingly, in the DAC output value memory 613, a current drive voltage applied between the drive electrode (fixed electrodes) 53, 53 and the electrode (movable electrodes) 51*a*, 51*a* on the side of the movable body 51 is stored.

The driving section 62 includes the DA converter 621 and a drive circuit 622. The DA converter 621 digital to analog converts the control signal output from the control signal generating section 63 to output the digital to analog converted signal to the drive circuit 622. The drive circuit 622 supplies the drive voltage according to the analog signal output from the DA converter 621 to the corresponding MEMS mirror.

The control signal generating section 63 includes the polarization amount calculating section 631 and a drive voltage setting section 632. The polarization amount calculating section 631 calculates, at each predetermined time, a change amount of the polarization amount in the insulating film after the lapse of the predetermined time, to update the polarization amount in the insulating film stored in the polarization amount memory 612. The drive voltage setting section 632 reads out the polarization amount in the insulating film from the polarization amount memory 612 and corrects the drive voltage according to the read polarization amount in the insulating film to set the new drive voltage.

The polarization amount calculating section 631 includes a polarization change amount calculating section 631a and a polarization amount updating section 631b. The polarization change amount calculating section 631a includes a plurality of groups having time constants different from each other according to a response speed of the polarization in the insulating film, to calculate the change amount (difference) of the polarization amount after the lapse of the predetermined time in each group.

The polarization amount updating section 631b adds the calculated change amount of the polarization amount after the lapse of the predetermined time in each group to a current polarization amount in each group to calculate a new polarization amount in each group, and updates the polarization amount in each group stored in a predetermined position of the polarization amount memory 612. Further, the polarization amount updating section 631b calculates the sum of the polarization amount in each group as the polarization amount in the insulating film after the lapse of the predetermined time, to update the polarization amount in the insulating film stored in a position different from the predetermined position of the polarization amount memory 612.

Here, there will be specifically described the calculation of the polarization amount in the insulating film by the polarization amount calculating section 631.

In the polarization, there are: electronic polarization due to displacement of electron (cloud); ion polarization due to deviation of atomic position inside a substance; orientation polarization due to rotation (orientation) of dipole moment in a molecule; and space-charge polarization in which charges transfer within the dielectric to generate the dipole moment. Among these polarizations, the electronic polarization and the ion polarization are induced at relatively high frequencies, and generally, in the MEMS mirror operating at frequencies lower than the frequencies at which the electronic polarization and the ion polarization are induced, the orientation polarization and the space-charge polarization become problematic especially.

Here, since the macromolecule insulating film (parylene C insulating film) as used in the present embodiment has an irregular molecular structure, it is considered that rotating (orientation) speeds of the dipole moments in respective molecules with the application of the drive voltage (that is, generation of an electric field E), that is, response speeds of the orientation polarization, are different from each other. Further, the space-charge polarization occurs when the electric field is applied for a sufficiently long time. Namely, it is considered that, in the macromolecule insulating film, the plurality of time constants, which are different depending on the ease of rotation (orientation) of the bipolar polarization for example, exists in response characteristics of the polarization.

FIG. 4 is a diagram showing properties of parylene C used as the insulating film in the present embodiment. As shown in FIG. 4, in parylene C, the dielectric constant thereof is changed depending on the frequencies, and accordingly, it is possible to understand from this point that the response speeds of the polarization are different from each other.

Therefore, in the present embodiment, the polarization is divided into a plurality of groups according to the response speeds of the polarization, to thereby set the polarization amount calculating model using respective time constants (t1, t2, . . . , tn). Then, the change amount of the polarization amount in the insulating film after the lapse of a predetermined time $\Delta t$ is calculated at each predetermined time $\Delta t$, and the calculated change amount is added to a previous value, so that the new polarization amount in the insulating film is calculated (updated). Such a polarization amount calculating model is set as follows.

Figure 5:
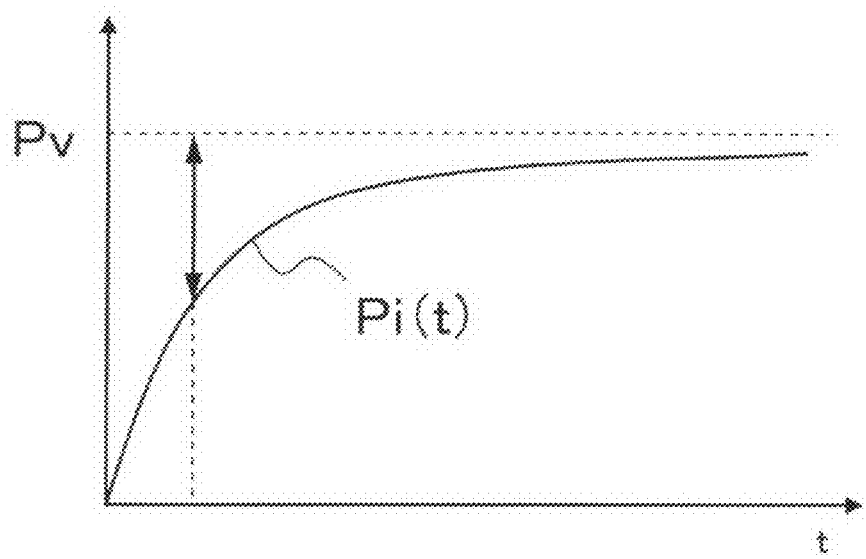
FIG. 5 is a diagram for explaining a polarization amount calculating model used in the embodiment.

Firstly, as shown in FIG. 5, a polarization amount Pi(t) at time (t) in each group can be approximated by a transition curve of each time constant (ti) provided that the polarization amount in the insulating film for when a predetermined drive voltage V is applied for a sufficiently long time (to be referred to as a final polarization amount, hereunder) is Pv. Namely, the polarization amount Pi(t) in each group is a time series change which gradually approaches the final polarization amount Pv with the time constant (ti) by the application of the drive voltage. This time series change is expressed by the following formula (1).

$$Pi(t) = Pv \times \left\{1 - \exp\left(\frac{-t}{ti}\right)\right\} \ (i = 1, 2, \ldots n) \quad (1)$$

$$Pv = \varepsilon_0 \chi_e E = \varepsilon_o\left(\frac{\varepsilon}{\varepsilon_0} - 1\right)E = \varepsilon_0(\varepsilon_\gamma - 1)E$$

In the above formula, $\in$: dielectric constant of the insulating film (at the frequencies of the drive voltage), $\in_\gamma$=relative dielectric constant, $\in_0$: dielectric constant in vacuum, E: applied electric field (=drive voltage V/distance r), and $\chi_e$: electric susceptibility of the insulating film.

Here, if the polarization amount after the lapse of the predetermined time $\Delta t$ from the time t is Pi(t+$\Delta t$), a change amount $\Delta Pi$ (=Pi(t+$\Delta t$)–Pi(t)) after the predetermined time ($\Delta t$) is expressed by the following formula (2).

$$\Delta Pi = Pv \times \exp\left(\frac{-t}{ti}\right) \times \left\{1 - \exp\left(\frac{-\Delta t}{ti}\right)\right\} \quad (2)$$

Since {Pv×exp(–t/ti)} on the right-hand side of the above formula (2) is equivalent to an arrow portion {Pv–Pi(t)} in FIG. 5, the formula (2) can be expressed by the following formula (3).

$$\Delta Pi = (Pv - Pi(t)) \times \left\{1 - \exp\left(\frac{-\Delta t}{ti}\right)\right\} \quad (3)$$

Thus, the polarization amount Pi(t+$\Delta t$) after the lapse of the predetermined time ($\Delta t$) is expressed by the following formula (4).

$$Pi(t + \Delta t) = Pi(t) + (Pv - Pi(t)) \times \left\{1 - \exp\left(\frac{-\Delta t}{ti}\right)\right\} \quad (4)$$

In the present embodiment, the above formulas (3) and (4) are each set as the polarization amount calculating model.

Since the final polarization amount Pv can be obtained if the current drive voltage V is understood, the formula (4) indicates that the polarization amount Pi(t+$\Delta t$) after the lapse of the predetermined time $\Delta t$ can be calculated if the current drive voltage V and the current polarization amount Pi(t) are understood. Then, in the configuration in which the polarization amount is calculated at each predetermined time Δt to update the polarization amount, the current polarization amount in the insulating film is the polarization amount in the insulating film, which is calculated before the predetermined time Δt, that is, the polarization amount in the insulating film, which is stored in the polarization amount memory 612.

Therefore, the polarization change amount calculating section 631a reads out, at each predetermined time Δt, the polarization amount in each group from the polarization amount memory 612, and also, reads out the currently applied drive voltage from the DAC output memory 613. Then, the polarization change amount calculating section 631a calculates, at each predetermined time Δt, the change amount ΔPi of the polarization amount in each group after the lapse of the predetermined time Δt, based on the formula (3). Here, the currently applied drive voltage also includes the drive voltage=0 (namely, the application of the drive voltage is temporarily stopped).

The polarization amount updating section 631b adds the calculated difference ΔPi of the polarization amount in each group to the read polarization amount Pi(t) in each group, to calculate the new polarization amount, and stores the new polarization amount in the predetermined position of the polarization amount memory 612 (updates the polarization amount in each group). Further, as shown in the following formula (5), the polarization amount updating section 631b calculates the sum of the calculated new polarization amount Pi(t+Δt) in each group as the polarization amount P(t+Δt) after the lapse of Δt, and stores the calculated polarization amount in the position different from the predetermined position of the polarization amount memory 612 (updates the polarization amount in the insulating film).

$$P(t + \Delta t) = \sum_{i=1}^{n} Pi(t + \Delta t) \quad (5)$$

It is also considered that the current polarization amount P(t) is calculated based on the formula (1). However, since the formula (1) contains the elapsed time t (variable), it is necessary to perform time measurement at each switching of the drive voltage. In this point, such time measurement does not need to be performed if the polarization amount is calculated based on the formulas (3) and (4), and therefore, the formulas (3) and (4) can be easily applied as the polarization calculating model, and also have advantages in that the polarization amount P(t+Δt) after the lapse of Δt can be calculated (predicted).

Figure 6:
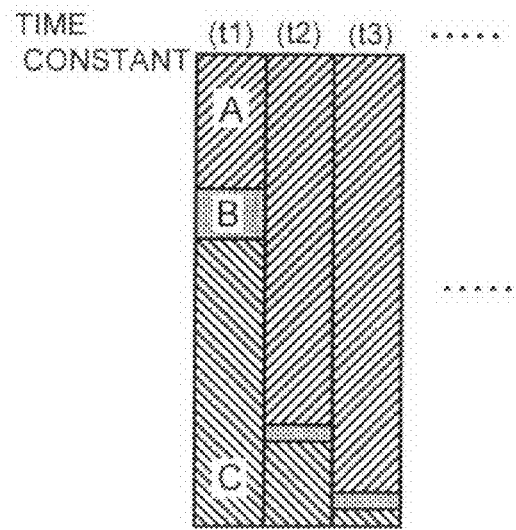
FIG. 6 is a diagram conceptually showing the above polarization amount calculating model.

FIG. 6 is a diagram conceptually showing the above polarization amount calculating model. There are n polarization calculating models for each polarization time constant. In FIG. 6, "A" is equivalent to the time constant in each group, "B" is equivalent to the difference ΔPi(t) of the polarization amount after the lapse of the predetermined time Δt in each group, which is calculated based on the formula (3), "C" is equivalent to the current polarization amount Pi(t), and "B+C" is equivalent to the polarization amount (updated value) Pi(t+Δt) after the lapse of Δt.

Incidentally, the time constant in each group which is previously obtained by the experiment or the like, is regulated so that the contribution thereof to the polarization in each group becomes approximately equal to each other. Further, in FIG. 6, a ratio of time constant between adjacent groups is made to be "exp(a)", namely, the constant-multiplier (a-multiplier) of natural logarithm. Here, "a" which is a regulated value, is changed depending on types of insulating film, the film thickness, laminating conditions or the like, and therefore, taking these into consideration, the time constant is individually regulated so that an optimum value thereof is set.

Returning to FIG. 3, the drive voltage setting section 632 includes an initial value setting section 632a that sets an initial value of the drive voltage, a correction value calculating section 632b that calculates a correction value for correcting the initial value of the drive voltage, and a drive voltage correcting section 632c that corrects the initial value of the drive voltage based on the calculated correction value.

When the setting command for the output port (output position) of each wavelength channel or the attenuation thereof is input from outside, the initial value setting section 632a sets the drive voltage (initial value) Vref for the corresponding MEMS mirror according to the input setting command. For example, when information relating to the wavelength channel number, the output port number of the output termination, the set attenuation and the like is input, the initial value setting section 632a refers to the table in the initial value memory 611 to read out the drive voltage Vref for the corresponding MEMS mirror.

On the other hand, the correction value calculating section 632b reads out the polarization amount in the insulating film from the polarization amount memory 612 at each predetermined time Δt, to calculate the correction amount of the drive voltage based on the read polarization amount. Incidentally, the reading out of the polarization amount in the insulating film from the polarization amount memory 612 may be performed at each predetermined time Δt after the input of the setting command. Herein, the polarization amount in the insulating film is read out from the polarization amount memory 612 in synchronism with the calculation of the polarization amount and the updating of the polarization amount in the polarization amount memory 612 by the polarization amount calculating section 631.

Hereunder, there will be specifically described the processing in the driving voltage setting section 632.

Firstly, if the drive voltage Vref is applied on the electrodes 53, 53 to hold the MEMS mirror at a target angle θ, the following formula (6) is established.

$$k\theta = \frac{1}{4\pi\varepsilon} \times \frac{q^2}{r^2} \quad (6)$$

In the above formula, k: spring constant of the torsion bar, q: charge amount, and r: distance between the fixed and movable electrodes.

Next, if the polarization amount in the insulating film is changed after the lapse of the predetermined time Δt namely, the dielectric constant is changed from ∈ to (∈+Δ∈), under the drive voltage Vref, so that the angle of the MEMS mirror is changed from θ to (θ+Δθ), the following formula (7) is established.

$$k(\theta + \Delta\theta) = \frac{1}{4\pi(\varepsilon + \Delta\varepsilon)} \times \frac{(q + \Delta q)^2}{r^2} \quad (7)$$

Here, if an electrode area is S and electrostatic capacity is C (C+ΔC), q=CVref=(∈S/r)×Vref, and (q+Δq)=(C+ΔC) Vref=((∈+Δ∈)S/r)×Vref can be expressed. As a result, an angle deviation amount Δθ of the MEMS mirror due to the polarization in the insulating film (change of the dielectric constant) is expressed by the following formula (8), to become a value proportional to the change of the dielectric constant. Namely, if the change of the dielectric constant in the insulating film is understood, the angle deviation amount $\Delta\theta$ of the MEMS mirror can be calculated.

$$\Delta\theta = \frac{S^2 Vref^2}{4\pi k r^4} \Delta\varepsilon \propto \Delta\varepsilon \qquad (8)$$

Further, the angle deviation amount $\Delta\theta$ of the MEMS mirror is converted into the attenuation of the optical signal. This conversion is for calculating an error relative to the input set attenuation.

The attenuation IL for when the angle of the MEMS mirror is deviated from a reference position by $\Delta\theta$ can be expressed by the following formula (9), in accordance with the Gaussian beam approximation (coupling efficiency).

$$IL = \exp\left(-\frac{\Delta\theta^2}{\sigma}\right) (\sigma : \text{beam spot size}) \qquad (9)$$

The formula (9) is differentiated for $\theta$, and as shown in the following formula (10), to obtain a change $\Delta IL$ of the attenuation with the angle deviation of the MEMS mirror.

$$\Delta IL = -2 \times \Delta\theta \times \exp\left(-\frac{\Delta\theta^2}{\sigma}\right) \qquad (10)$$

Thus, if $\Delta\theta$ calculated based on the formula (8) is assigned to the formula (10), namely, if the change of the dielectric constant is understood, it is possible to calculate the attenuation change $\Delta IL$ with the angle deviation of the MEMS mirror caused by the polarization in the insulating film.

Therefore, the correction value calculating section 632b reads out the polarization amount in the insulating film at each predetermined time $\Delta t$, that is, the polarization amount P(t+$\Delta t$) in the insulating film after the lapse of the predetermined time $\Delta t$, from the polarization amount memory 612, and multiplies a predetermined regulation value on the read polarization amount to obtain $P_{t+\Delta t}$, to convert it into the change of the dielectric constant based on the following formula (11).

$$D=(\varepsilon 0 \times E+P)+P_{t+\Delta t}=\varepsilon \times E+P_{t+\Delta t}=(\varepsilon+\Delta\varepsilon)\times E \qquad (11)$$

Then, the correction value calculating section 632b calculates the change $\Delta IL$ (namely, a control error amount) of the attenuation for when the drive voltage (initial value) Vref read out by referring to the table is directly applied, and calculates the correction value for correcting the initial value of the drive voltage based on the calculated change $\Delta IL$ of the attenuation. For example, a relation between the attenuation and the MEMS mirror angle and a relation between the MEMS mirror angle and the drive voltage are previously obtained, and a voltage value equivalent to the change $\Delta IL$ of the attenuation is calculated as the correction value based on these relations.

The drive voltage correcting section 632c adds the correction value calculated by the correction value calculating section 632b to the drive voltage (initial value) Vref set by the initial value setting section 632a (namely, corrects the drive voltage), to set an added value as a new drive voltage, and outputs a control signal according to the new drive voltage to the driving section 62.

Here, the change $\Delta IL$ of the attenuation is calculated based on the polarization amount in the insulating film after the lapse of the predetermined time $\Delta t$, and the drive voltage is feedforward corrected. Further, the calculation of the correction value by the correction value calculating section 632b and the calculation of the new drive voltage by the drive voltage correcting section 632c are performed at each predetermined time $\Delta t$. Therefore, the drive voltage applied between the movable electrode 51a, 51a and the drive electrode 53, 53 is also changed (updated) at each predetermined time ($\Delta t$).

Figure 7:
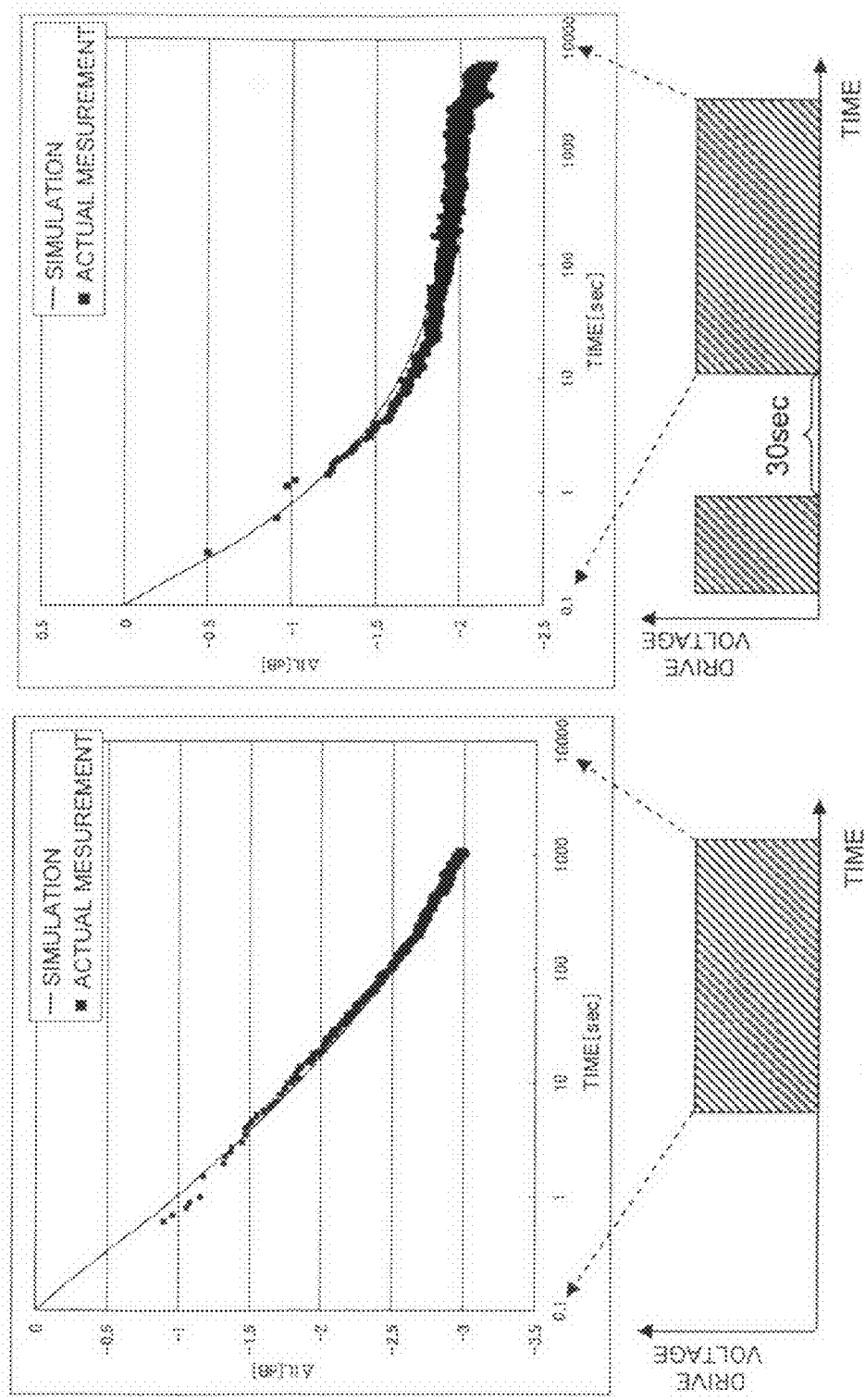
FIG. 7 is a diagram showing a comparison result of a calculation value of a change (ΔIL) in attenuation with an actual measurement value thereof, according to the embodiment.

FIG. 7 shows a comparison result of the change $\Delta IL$ (simulation result) of the attenuation calculated based on the formulas (8) to (11) with the actually measured value. As shown in FIG. 7, it is verified that the calculated value of the change $\Delta IL$ of the attenuation according to the present embodiment can substantially trace the actually measured value. Especially, as shown in the right side of FIG. 7, it is verified that the calculated value of the change $\Delta IL$ of the attenuation can substantially trace the actually measured value with precision even when the application of the drive voltage is temporarily stopped and thereafter, is resumed.

Figure 8:
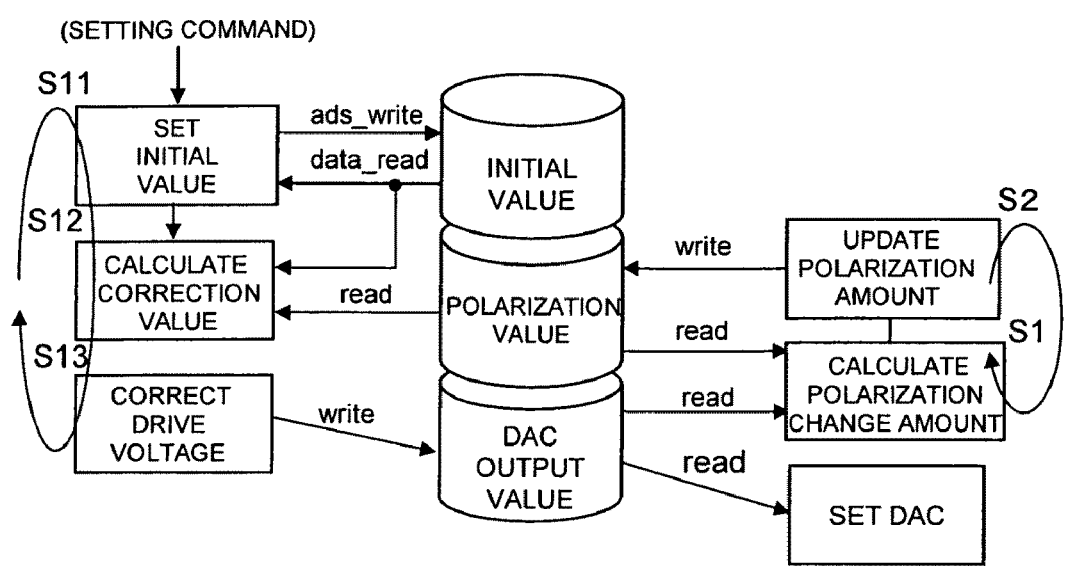
FIG. 8 is a diagram showing a control flowchart by the control section.

FIG. 8 shows a flowchart of the above described control. In the present control, there are two independent loops. One of the loops is for reading out the polarization amount in the insulating film and the DAC output value (drive voltage) at each predetermined time to calculate the change amount of the polarization after the lapse of the predetermined time (S1), and for adding the calculated polarization amount to the previous value (read polarization amount) to update the polarization amount in the insulating film (S2).

The other loop is for reading out the drive voltage (initial value) corresponding to the input setting command when the setting command for the output port of each wavelength channel and the attenuation thereof is input (S11), and also, reading out the polarization amount in the insulating film at each predetermined time in synchronism with the updating of the polarization amount in the insulating film to calculate the correction value (S12), and for correcting the drive voltage (initial value) to set the new drive voltage (S13).

Figure 9:
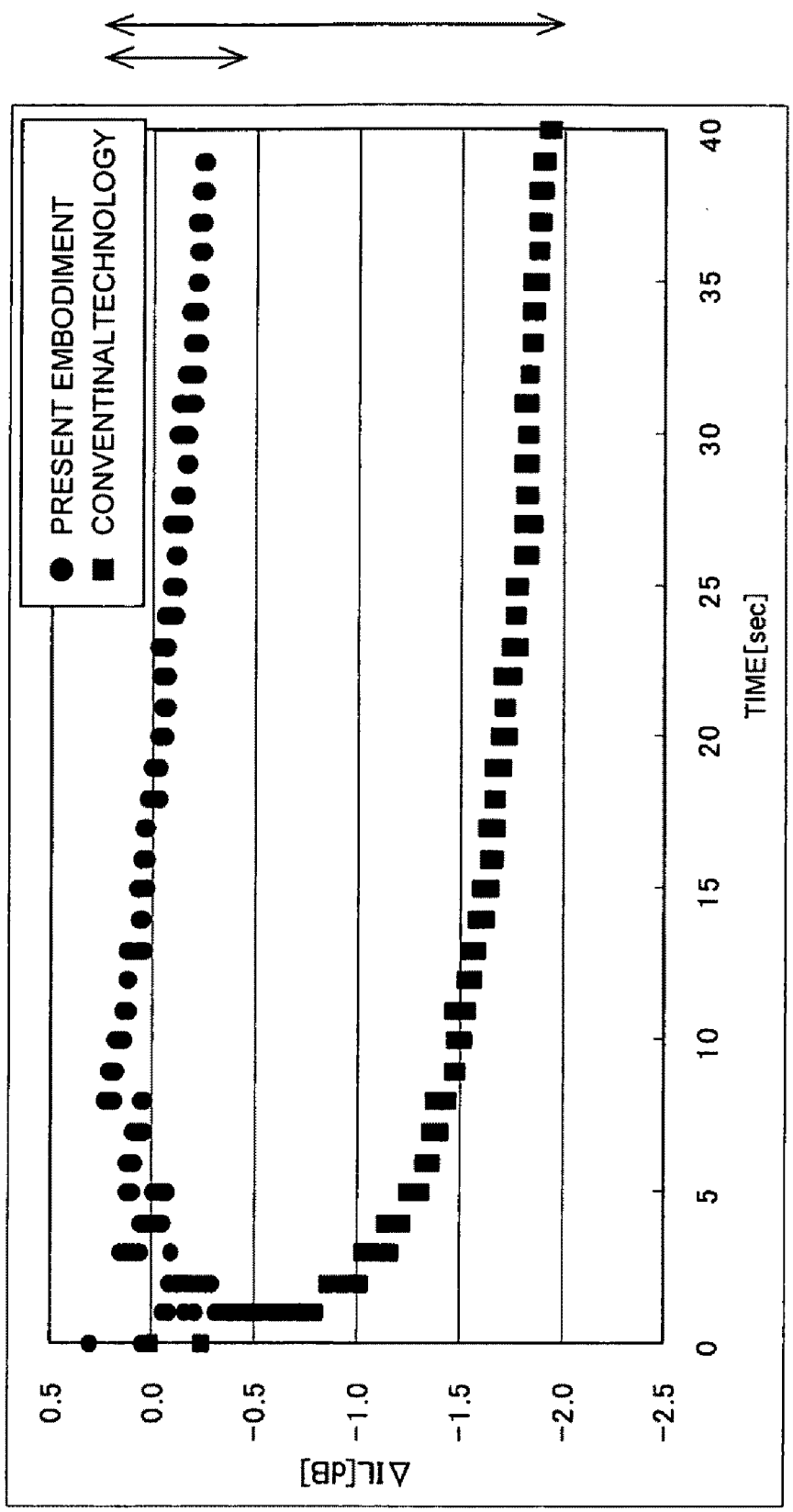
FIG. 9 is a diagram for explaining effects of the embodiment.

FIG. 9 is a diagram showing effects of the present embodiment. As shown in FIG. 9, when the drive voltage (initial value) Vref corresponding to the input setting command is directly applied (shown by "black rectangles (conventional technology)" in the figure), a control error of approximately 2 (dB) occurs after about one minute from the application of the drive voltage. Contrary to this, in the present embodiment, when the predetermined time is 0.3 (s) and the polarization amount in the insulating film and the correction value are calculated at each 0.3 (s) to perform the control (shown by "black circles (present embodiment)" in the figure), it is verified that the control error after about one minute can be suppressed to 0.5 (dB) or less.

In the above, the description has been mainly made on the control for when a power source of the wavelength selective switch is ON. However, when the power is supplied (resupplied) to the wavelength selective switch, since the polarization amount in the insulating film stored in the polarization amount memory 612 is not updated, it is desirable to calculate the polarization amount in the insulating film at the power supply time by another method. In this case, the wavelength selective switch may be provided with a timer and a power shut-off clock time memory which stores a power shut-off clock time, so that the polarization amount in each group at the power resupply time is calculated based on the following formula (12) for example, and the sum of the polarization amount in each group is set as the polarization amount in the insulating film at the power supply time.

$$Pi_{p-on} = Pi_{p-off} \times \exp(-(t_{p-off} - t_{now})/ti) \tag{12}$$

In the above formula, $Pi_{p-on}$ is the polarization amount (updated value) in the insulating film at the power supply time, $t_{p-off}$ is the clock time at the power shut-off time, $Pi_{p-off}$ is the polarization amount in each group at the power shut-off time, and $t_{now}$ is a current clock time.

Figure 10:
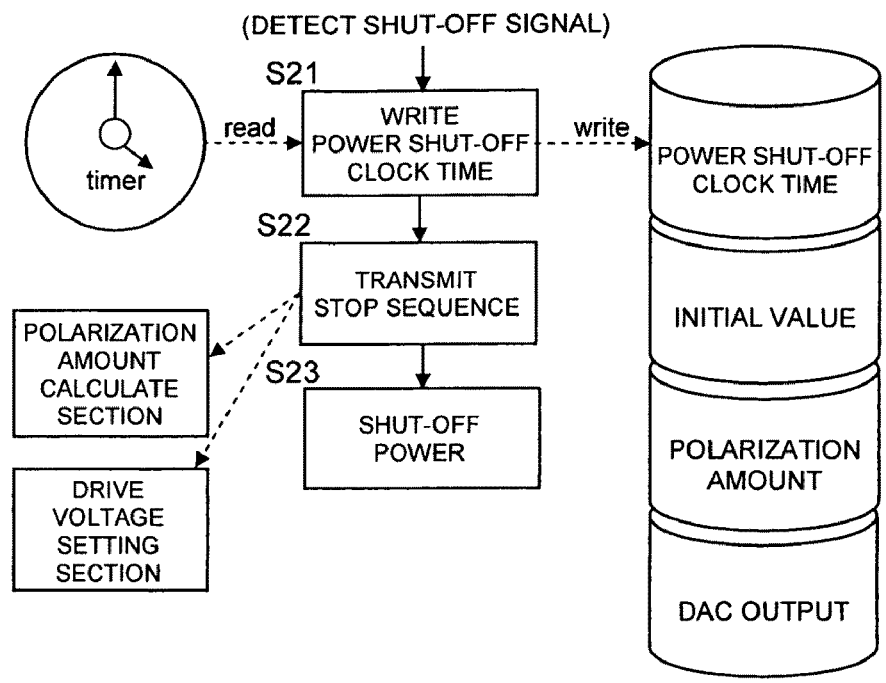
FIG. 10 is a diagram showing a control flowchart by the control section when the power supply to the wavelength selective switch is shut off.
Figure 11:
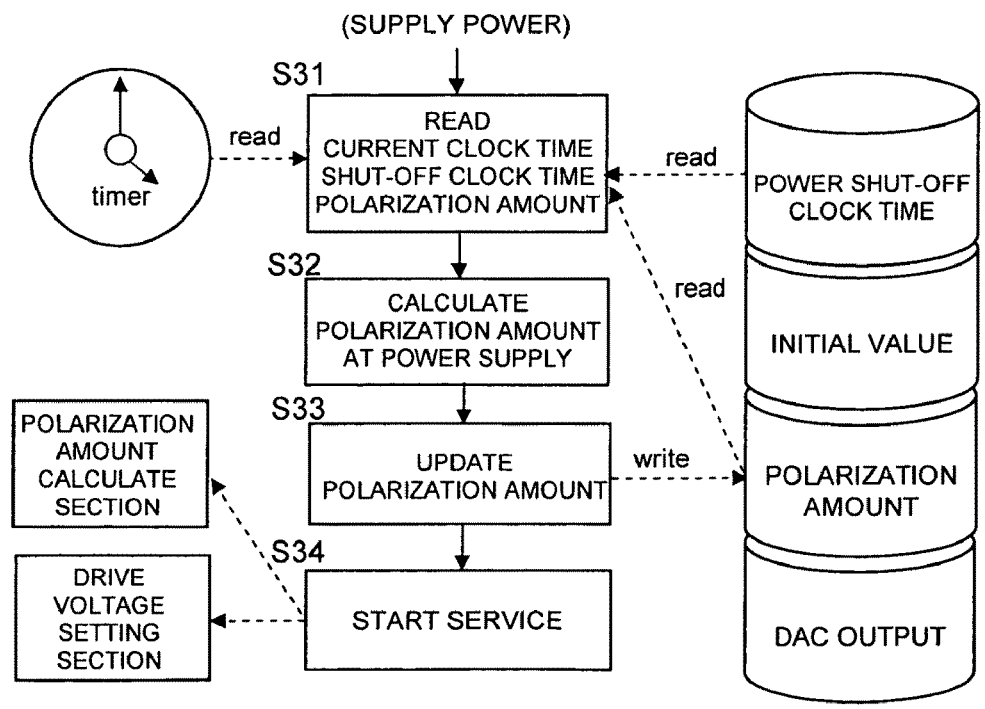
FIG. 11 is a diagram showing a control flowchart by the control section when the power to the wavelength selective switch is supplied.

FIG. 10 shows a flowchart of a control at the time when the power supply to the wavelength selective switch is shut off, and FIG. 11 shows flowchart of a control at the time when the power is supplied to the wavelength selective switch.

At the time when the power supply is shut off, as shown in FIG. 10, when detecting a power shut-off signal, the control section 6 writes the clock time at which the power supply is shut off into a power shut-off clock time memory portion (power shut-off clock time area) of the memory section 61 (S21). Then, the control section 6 transmits a stop signal of the computation processing to the polarization amount calculating section 631 and to the drive voltage setting section 632 (S22), and thereafter, shuts off the power supply (S23).

At the time when the power is supplied, as shown in FIG. 11, when the power is supplied (resupplied), the control section 6 reads out the clock time ($t_{p-off}$) at which the power supply is shut off, from the power shut-off clock time area (the power shut-off clock time memory portion) in the memory section 61, and reads out the polarization amount $p_{ip-off}$ at the time when the power supply is shut off, from the polarization amount memory 612 (S31). Then, the control section 6 calculates the polarization amount in the insulating film at the time when the power is supplied based on the formula (12) (S32), and updates the polarization amount in the insulating film stored in the polarization amount memory 612 (S33). Thereafter, the processing is shifted to the above described normal calculation and update processing of the polarization amount in the insulating film (refer to the formulas (3), (4) and the like) (S34).

As described in the above, in the wavelength selective switch according to the present embodiment, the polarization amount in the insulating film is calculated at each predetermined time, to thereby update the polarization amount in the insulating film stored in the polarization amount memory 612. On the other hand, when the setting command from the output port of each wavelength channel and the attenuation thereof is input, the drive voltage (initial value) corresponding to the setting command is read out from the initial value memory 611, and the (newest) polarization amount in the insulating film is read out from the polarization amount memory 612 at each predetermined time. Then, the new drive voltage is set based on the read drive voltage (initial value) and the read polarization amount in the insulating film, to thereby apply the new drive voltage between the movable electrode and the fixed electrode.

Thus, since the drive voltage can be regulated considering the change of the polarization amount in the insulating film, the angle of the MEMS mirror can be controlled at the desired angle with high precision, regardless of the polarization change in the insulating film with the application of the drive voltage. Especially, the polarization amount in the insulating film stored in the polarization amount memory 612 has the value after the lapse of the predetermined time ($\Delta t$) from the current time, so that the drive voltage can be feedforward corrected (regulated). Therefore, it is possible to effectively suppress the angle deviation of the MEMS mirror and the increase of the attenuation thereof (the deviation from the set attenuation) due to the polarization in the insulating film.

Incidentally, in the present embodiment, the change $\Delta IL$ of the attenuation in the case where the drive voltage (initial value) Vref read out from the initial value memory 611 is directly applied, is calculated, and the correction value is calculated based on the calculated $\Delta IL$ of the attenuation. However, the present invention is not limited thereto.

For example, it is also possible to calculate a drive voltage V' for holding the angle of the MEMS mirror at $\theta$ even if the polarization amount in the insulating film is changed so that the dielectric constant is changed from $\in$ to ($\in + \Delta \in$). In this case, the following formula (13) is used in place of the formula (7).

$$k\theta = \frac{1}{4\pi(\varepsilon + \Delta\varepsilon)} \times \frac{(q + \Delta q)^2}{r^2} \tag{13}$$

Here, since $(q+\Delta q)=(C+\Delta C)\times V'$ can be expressed, the drive voltage V' for holding the angle of the MEMS mirror at $\theta$ is expressed by the following formula (14), based on the formulas (6) and (13).

$$V' = \sqrt{\frac{\varepsilon}{\varepsilon + \Delta\varepsilon} \cdot Vref} \tag{14}$$

This drive voltage V' is equivalent to a drive voltage capable offsetting the angle deviation amount of the MEMS mirror caused by the change of the polarization amount in the insulating film, and can be obtained if the dielectric constant is understood. The drive voltage may be more simply corrected as in the above manner.

Further, the present embodiment is applied to the wavelength selective switch, but is not limited thereto. The present invention can be applied to an optical switch using a MEMS mirror in which at least one of a movable electrode disposed on a movable body having an optical reflecting surface and a fixed electrode arranged to face the movable electrode is coated by an insulating film, and an angle of the optical reflecting surface is changed by an electrostatic force generated when a drive voltage is applied between the movable electrode and the fixed electrode.

According to the optical switch and the control method of the optical switch as described above, the information relating to the polarization amount in the insulating film is calculated at each predetermined time so that the information relating to the polarization amount in the insulating film stored in the polarization amount memory is updated. Further, when the drive voltage is applied, the information relating to the polarization amount in the insulating film is read out from the polarization amount memory, and the drive voltage is corrected according to the read information relating to the polarization amount in the insulating film. As a result, relative to the ever-changing polarization amount in the insulating film, the drive voltage can be regulated according to the newest polarization amount in the insulating film at the time, and therefore, the control precision of the MEMS mirror can be improved. Further, it is possible to suppress an increase of insertion loss of the optical switch.

Further, as already described, the problem in that the displacement amount of the movable body relative to the drive voltage is deviated due to the polarization in the insulating film is not limited to the MEMS mirror, but is common to MEMS devices each driving the movable body by the electrostatic force. The present invention can be applied to such MEMS devices. To be specific, the present invention can be applied to a MEMS device in which at least one of a movable electrode disposed on a movable body and a fixed electrode arranged to face the movable electrode is coated by an insulating film, and the movable body is operated by an electrostatic force generated when a predetermined drive voltage is applied between the movable electrode and the fixed electrode.

In the above case, the MEMS device may be controlled as follows by a configuration equivalent to the control section 6. Namely, a polarization amount in the insulating film is calculated at each predetermined time to update the polarization amount in the insulating film stored in a polarization amount memory which stores the polarization amount in the insulating film, the polarization amount in the insulating film is read out from the polarization amount memory, the drive voltage is corrected according to the read polarization amount in the insulating film to set a new drive voltage, and the set new drive voltage is applied between the movable electrode and the fixed electrode.

Preferably, when a target operating position of the movable body is set, an initial value of the drive voltage corresponding to the target operating position is read out from an initial value memory in which the drive voltage corresponding to the operating position of the movable body is previously stored, and also, the polarization amount in the insulating film is read out from the polarization amount memory at each predetermined time, and the initial value of the drive voltage is corrected according to the read polarization amount in the insulating film to thereby set the new drive voltage. Other controls may be performed as well as the controls in the above described wavelength selective switch.

In such a control method of the MEMS device, since the drive voltage can be regulated according to the ever-changing newest polarization amount in the insulating film, the control precision of the movable body can be improved.

All examples and conditional language recited herein are intended for pedagogical purposes to aid the reader in understanding the principles of the invention and concepts contributed by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical switch including at least one MEMS mirror and a control section that regulates an angle of an optical reflecting surface of the MEMS mirror to lead an input optical signal to a predetermined output position,
    wherein in the MEMS mirror, at least one of a movable electrode disposed on a movable body including the optical reflecting surface and a fixed electrode arranged to face the movable electrode is coated by an insulating film, and the angle of the optical reflecting surface is changed by an electrostatic force generated when a drive voltage is applied between the movable electrode and the fixed electrode,
    the control section comprising:
    a polarization amount memory which stores information relating to a polarization amount in the insulating film;
    a polarization amount calculating section that calculates the information relating to the polarization amount in the insulating film at each predetermined time to update the information relating to the polarization amount in the insulating film stored in the polarization amount memory;
    a drive voltage setting section that reads out the information relating to the polarization amount in the insulating film from the polarization amount memory, and corrects the drive voltage according to the read information relating to the polarization amount in the insulating film, to set a new drive voltage; and
    a driving section that applies the set new drive voltage between the movable electrode and the fixed electrode.

2. An optical switch according to claim 1, further comprising;
    an initial value memory in which an initial value of the drive voltage corresponding to at least one of an output position of the optical signal and the attenuation thereof is previously stored,
    wherein, when a setting command for at least one of the output position of the optical signal and attenuation thereof is input, the drive voltage setting section reads out the initial value of the drive voltage corresponding to the input setting command from the initial value memory, and also, reads out the information relating to the polarization amount in the insulating film from the polarization amount memory at each predetermined time, and corrects the initial value of the drive voltage according to the read information relating to the polarization amount in the insulating film, to set a new drive voltage.

3. An optical switch according to claim 1,
    wherein the polarization amount calculating section calculates the polarization amount in the insulating film after the lapse of the predetermined time, based on a current drive voltage and the information relating to the polarization amount in the insulating film read out from the polarization amount memory.

4. An optical switch according to claim 1,
    wherein the polarization amount calculating section includes a plurality of groups according to a response speed of the polarization in the insulating film, and calculates information relating to a polarization amount in each group, to calculate the information relating to the polarization amount in the insulating film based on the sum of the polarization amount in each group.

5. An optical switch according to claim 4,
    wherein the polarization amount calculating section calculates the polarization amount Pi(t) in each group based on the following formulas.

$$Pi(t + \Delta t) = Pi(t) + (Pv - Pi(t)) \times \left\{1 - \exp\left(\frac{-\Delta t}{ti}\right)\right\} \ (i = 1, 2, \ldots, n)$$

$$Pv = \varepsilon_0 \chi_e E = \varepsilon_0 \left(\frac{\varepsilon}{\varepsilon_0} - 1\right) E = \varepsilon_0 (\varepsilon_\gamma - 1) E$$

($\Delta t$: time interval of calculation, $\in_0$: dielectric constant in vacuum, $\chi_e$: electric susceptibility of insulating film, $\in$: dielectric constant of insulating film, $\in_r$: relative dielectric constant of insulating film, and E: electric field generated by application of drive voltage).

6. An optical switch according to claim 1,
    wherein the drive voltage setting section reads out the polarization amount in the insulating film from the polarization amount memory in synchronism with the updating of the information relating to the polarization amount in the insulating film stored in the polarization amount memory by the polarization amount calculating section.

7. An optical switch according to claim 1, further comprising:
a timer; and
a power shut-off clock time memory which stores a power shut-off clock time detected by the timer,
wherein, when a power is supplied, the polarization amount calculating section reads out the power shut-off clock time stored in the power shut-off clock time, and also, reads out the information relating to the polarization amount in the insulating film from the polarization amount memory, and calculates the information relating to the polarization amount in the insulating film for when the power is supplied, based on the read power shut-off clock time and the information relating to the polarization amount in the insulating film, and a current clock time, to update the information relating to the polarization amount in the insulating film stored in the polarization amount memory.

8. A control method of an optical switch which includes at least one MEMS mirror and regulates an angle of an optical reflecting surface of the MEMS mirror to lead an input optical signal to a predetermined output position,
wherein in the MEMS mirror, at least one of a movable electrode disposed on a movable body including the optical reflecting surface and a fixed electrode arranged to face the movable electrode is coated by an insulating film, and the angle of the optical reflecting surface is changed by an electrostatic force generated when a drive voltage is applied between the movable electrode and the fixed electrode, and
the method comprising:
calculating information relating to a polarization amount in the insulating film at each predetermined time to update the information relating to the polarization amount in the insulating film stored in a polarization amount memory which stores the information relating to the polarization amount in the insulating film;
reading out the information relating to the polarization amount in the insulating film from the polarization amount memory and correcting the drive voltage according to the read information relating to the polarization amount in the insulating film, to set a new drive voltage; and
applying the set new drive voltage between the movable electrode and the fixed electrode.

9. A control method of an optical switch according to claim 8,
wherein, when a setting command for at least one of the output position of the optical signal and attenuation thereof is input, an initial value of the drive voltage corresponding to the input setting command is read out from an initial value memory which previously stores the initial value of the drive voltage corresponding to at least one of the output position of the optical signal and the attenuation thereof, and also, the information relating to the polarization amount in the insulating film is read out from the polarization amount memory at each predetermined time, and the initial value of the drive voltage is corrected according to the read information relating to the polarization amount in the insulating film, to thereby set the new drive voltage.

10. A control method of an optical switch according to claim 8,
wherein the information relating to the polarization amount in the insulating film after the lapse of the predetermined time is calculated based on a current drive voltage and the information relating to the polarization amount in the insulating film read out from the polarization amount memory, to thereby update the information relating to the polarization amount in the insulating film stored in the polarization amount memory.

11. A control method of an optical switch according to claim 8,
wherein the information relating to the polarization amount in the insulating film is read out from the polarization amount memory in synchronism with the updating of the information relating to the polarization amount in the insulating film stored in the polarization amount memory, and the drive voltage is corrected according to the read information relating to the polarization amount in the insulating film, to thereby set the new drive voltage.

12. A control method of a MEMS device in which at least one of a movable electrode disposed on a movable body and a fixed electrode arranged to face the movable electrode is coated by an insulating film, and the movable body is operated by an electrostatic force generated when a predetermined drive voltage is applied between the movable electrode and the fixed electrode, the method comprising:
calculating information relating to a polarization amount in the insulating film at each predetermined time to update the information relating to the polarization amount in the insulating film stored in a polarization amount memory which stores the information relating to the polarization amount in the insulating film;
reading out the information relating to the polarization amount in the insulating film from the polarization amount memory, and correcting the drive voltage according to the read information relating to the polarization amount in the insulating film, to set a new drive voltage; and
applying the set new drive voltage between the movable electrode and the fixed electrode.

13. A control method of a MEMS device according to claim 12,
wherein, when a target operating state of the movable body is set, an initial value of the drive voltage corresponding to the set target operating state of the movable body is read out from an initial value memory which previously stores the initial value of the drive voltage corresponding to an operating state of the movable body, and also, the information relating to the polarization amount in the insulating film is read out from the polarization amount memory at each predetermined time, and the initial value of the drive voltage is corrected according to the read information relating to the polarization amount in the insulating film, to thereby set the new drive voltage.

14. A control method of a MEMS device according to claim 12,
wherein the information relating to the polarization amount in the insulating film after the lapse of the predetermined time is calculated based on a current drive voltage and the information relating to the polarization amount in the insulating film read out from the polarization amount memory, to thereby update the information relating to the polarization amount in the insulating film stored in the polarization amount memory.

15. A control method of a MEMS device according to claim 12, wherein the information relating to the polarization amount in the insulating film is read out from the polarization amount memory in synchronism with the updating of the information relating to the polarization amount in the insulating film stored in the polarization amount memory, and the drive voltage is corrected according to the read information relating to the polarization amount in the insulating film, to there by set the new drive voltage.

* * * * *

UNITED STATES PATENT AND TRADEMARK OFFICE
CERTIFICATE OF CORRECTION

PATENT NO.       : 7,961,993 B2
APPLICATION NO.  : 12/292278
DATED            : June 14, 2011
INVENTOR(S)      : Takashi Shimizu et al.

It is certified that error appears in the above-identified patent and that said Letters Patent is hereby corrected as shown below:

In claim 5, Column 16, lines 58, delete " $\in_0:$ " and insert -- $\varepsilon_0:$ --, therefore.

In claim 5, Column 16, line 59, delete " $\in_0:$ " and insert -- $\varepsilon_0:$ --, therefore.

In claim 5, Column 16, line 60, delete " $\in_0:$ " and insert -- $\varepsilon_0:$ --, therefore.

Signed and Sealed this
Ninth Day of August, 2011

David J. Kappos
*Director of the United States Patent and Trademark Office*